US008090193B2

(12) United States Patent
Higaki et al.

(10) Patent No.: US 8,090,193 B2
(45) Date of Patent: Jan. 3, 2012

(54) MOBILE ROBOT

(75) Inventors: Nobuo Higaki, Wako (JP); Ryujin Watanabe, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 653 days.

(21) Appl. No.: 12/315,411

(22) Filed: Dec. 3, 2008

(65) Prior Publication Data
US 2009/0148034 A1 Jun. 11, 2009

(30) Foreign Application Priority Data
Dec. 6, 2007 (JP) .................................. 2007-316246

(51) Int. Cl.
*G06K 9/00* (2006.01)
*G06K 9/40* (2006.01)
*G06F 19/00* (2011.01)

(52) U.S. Cl. ........ 382/153; 382/103; 382/263; 382/264; 700/245

(58) Field of Classification Search .................. 382/106, 382/153, 117–118, 168, 171–173, 190, 199, 382/203, 266, 274, 289, 296, 263, 264, 299, 382/254, 275, 155, 156, 181; 901/46, 47; 348/61, 143, 159, 113, E7.086, 148, E7.08, 348/154; 250/559.33; 345/8, 7; 356/27, 356/615; 700/245
See application file for complete search history.

(56) References Cited

U.S. PATENT DOCUMENTS

| 4,638,445 | A | * | 1/1987 | Mattaboni | 701/23 |
| 4,893,183 | A | * | 1/1990 | Nayar | 348/135 |
| 5,675,663 | A | * | 10/1997 | Koerner et al. | 382/181 |
| 6,198,847 | B1 | * | 3/2001 | Washizawa | 382/228 |
| 6,215,519 | B1 | * | 4/2001 | Nayar et al. | 348/159 |
| 6,401,846 | B1 | | 6/2002 | Takenaka et al. | |
| 7,023,913 | B1 | * | 4/2006 | Monroe | 375/240.01 |
| 7,584,020 | B2 | * | 9/2009 | Bruemmer et al. | 700/245 |
| 7,620,477 | B2 | * | 11/2009 | Bruemmer | 700/245 |
| 7,822,508 | B2 | * | 10/2010 | Sugiyama et al. | 700/245 |
| 2006/0126918 | A1 | | 6/2006 | Oohashi et al. | |
| 2006/0126941 | A1 | | 6/2006 | Higaki | |
| 2007/0152619 | A1 | | 7/2007 | Sugiyama et al. | |

FOREIGN PATENT DOCUMENTS

JP 05-192895 8/1993
JP 2001-062760(A) 3/2001
(Continued)

*Primary Examiner* — Sheela Chawan
(74) *Attorney, Agent, or Firm* — Carrier Blackman & Associates, P.C.; Joseph P. Carrier; William D. Blackman

(57) ABSTRACT

There is disclosed a mobile robot including an image processor that generates recognition information regarding a target object included in a taken image, and a main controller integrally controlling the robot based on this recognition information. The image processor executes steps of: generating a low-resolution image and at least one high-resolution image whose resolution higher than that of the low-resolution image; generating first target object information regarding the target object from the low-resolution image; determining which high-resolution image should be processed if two or more high-resolution images are generated, and then defining a resolution process region in the low-resolution image; processing a region in the high-resolution region corresponding to the resolution process region in the low-resolution image, so as to generate second target object information in the high-resolution image; and determining whether or not the first and the second target object information are matched; and based on this determination, using at least either of the first and the second target object information, thereby to generate the recognition information.

13 Claims, 10 Drawing Sheets

FOREIGN PATENT DOCUMENTS

| | | |
|---|---|---|
| JP | 2004-299026(A) | 10/2004 |
| JP | 2006-171929 | 6/2006 |
| JP | 2006-192563(A) | 7/2006 |
| JP | 2007-160447(A) | 6/2007 |

\* cited by examiner

FIG. 4

| TASK ID | PRIORITY | IMPORTANCE | ROBOT ID | CONTENT | START POINT | END POINT | REQUIRED TIME | START TIME | END TIME | STATUS |
|---|---|---|---|---|---|---|---|---|---|---|
| 1 | | 1 | | GUIDE | www, xxx, yyy | ooo, ppp, qqq | 3 | 10:27 | 10:30 | END |
| 2 | | 3 | | GUIDE | | | 5 | 10:40 | 10:45 | STANBY |
| 3 | | 2 | | TRANSPORT | | | 10 | 10:45 | 10:55 | RESERVED |
| 4 | | 4 | | GUIDE | | | 5 | 10:45 | 10:50 | RESERVED |
| ... | ... | ... | ... | ... | ... | ... | ... | ... | ... | ... |
| 10 | | 3 | | TRANSPORT | ooo, ooo, ooo | xxx, yyy, zzz | 5 | 11:00 | 11:05 | UNDONE |
| ... | ... | ... | ... | ... | ... | ... | ... | ... | ... | ... |

| ROBOT ID | ID=1 | | | | ID=2 | | |
|---|---|---|---|---|---|---|---|
| PRIORITY ORDER | TASK ID | PRIORITY | CONTENT | STATUS | TASK ID | PRIORITY | |
| 1 | 3 | 3 | TRANSPORT | IN EXECUTION | 4 | 7 | |
| 2 | 7 | 4 | GUIDE | RESERVED | 6 | 2 | |
| 3 | ... | ... | ... | ... | ... | ... | |

500

FIG. 7
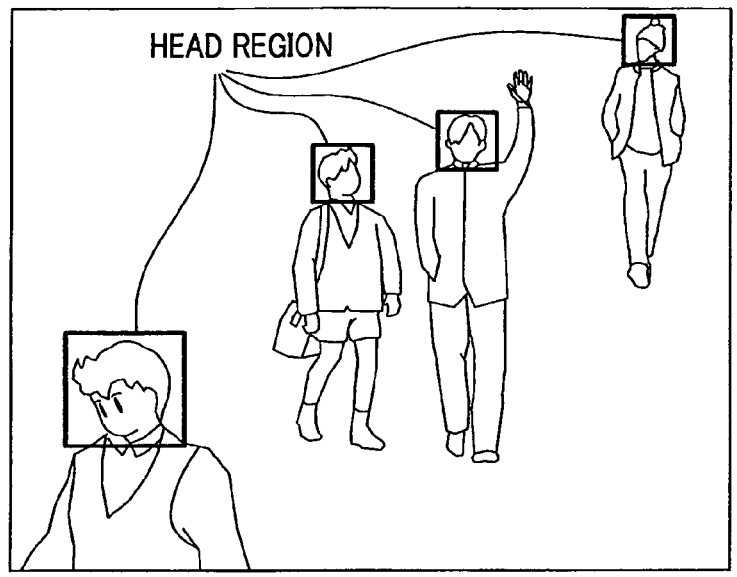
LOW-RESOLUTION IMAGE
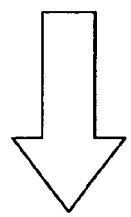
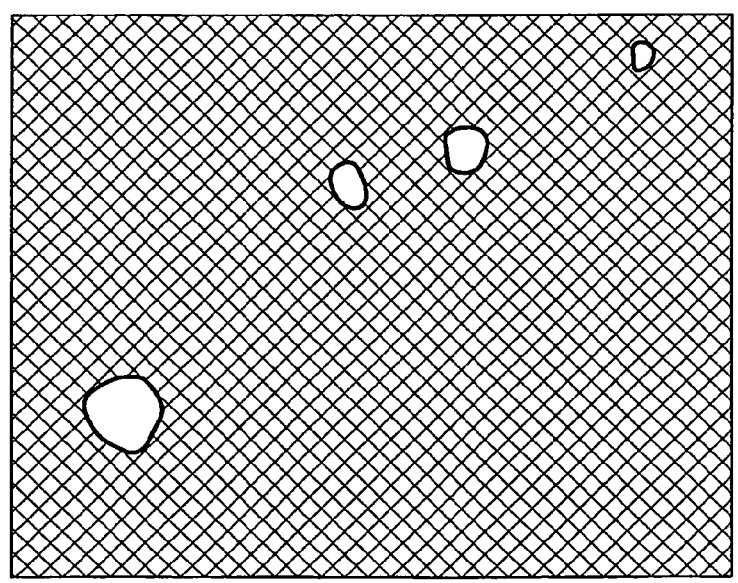
FACE REGION

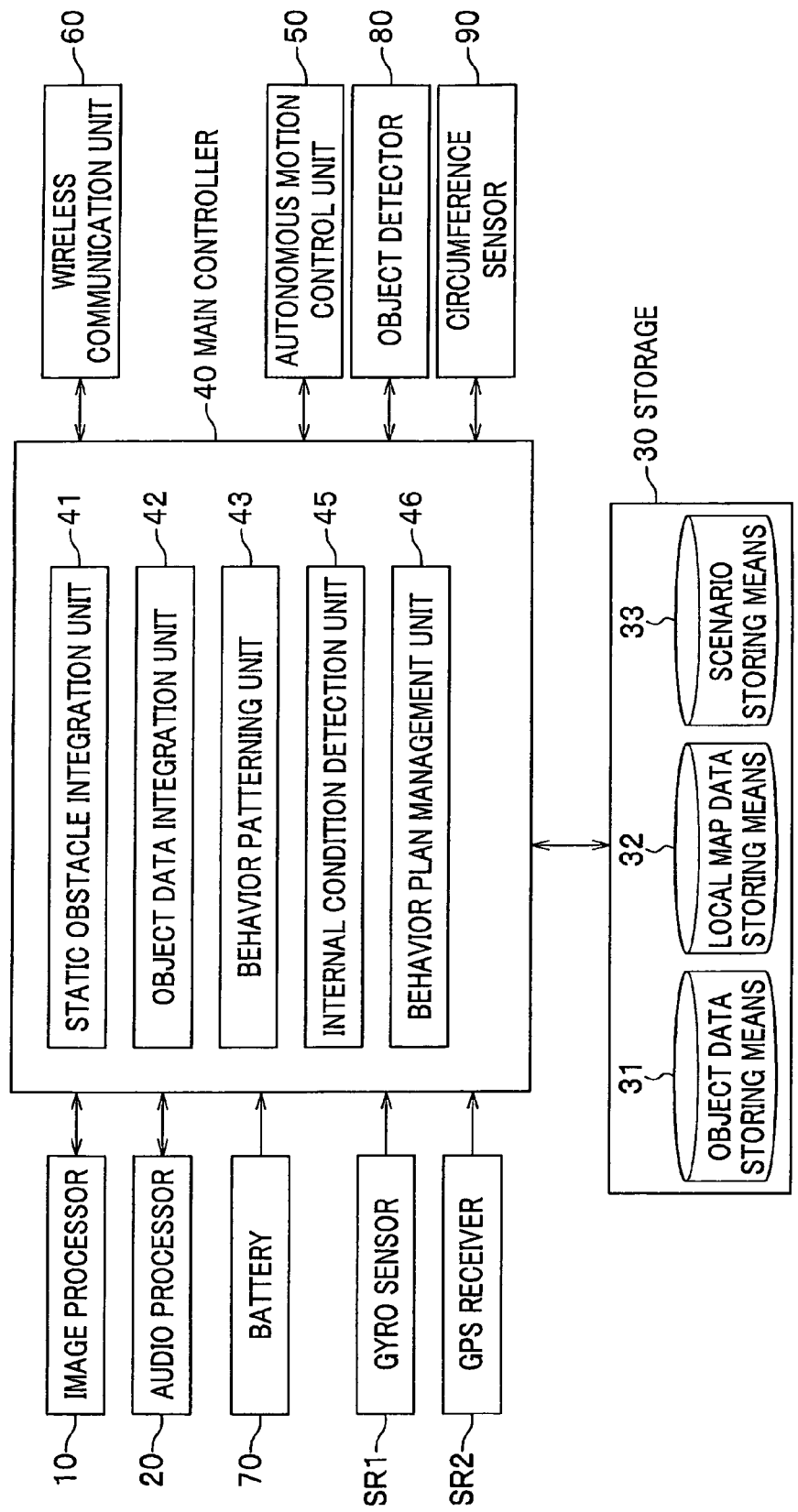

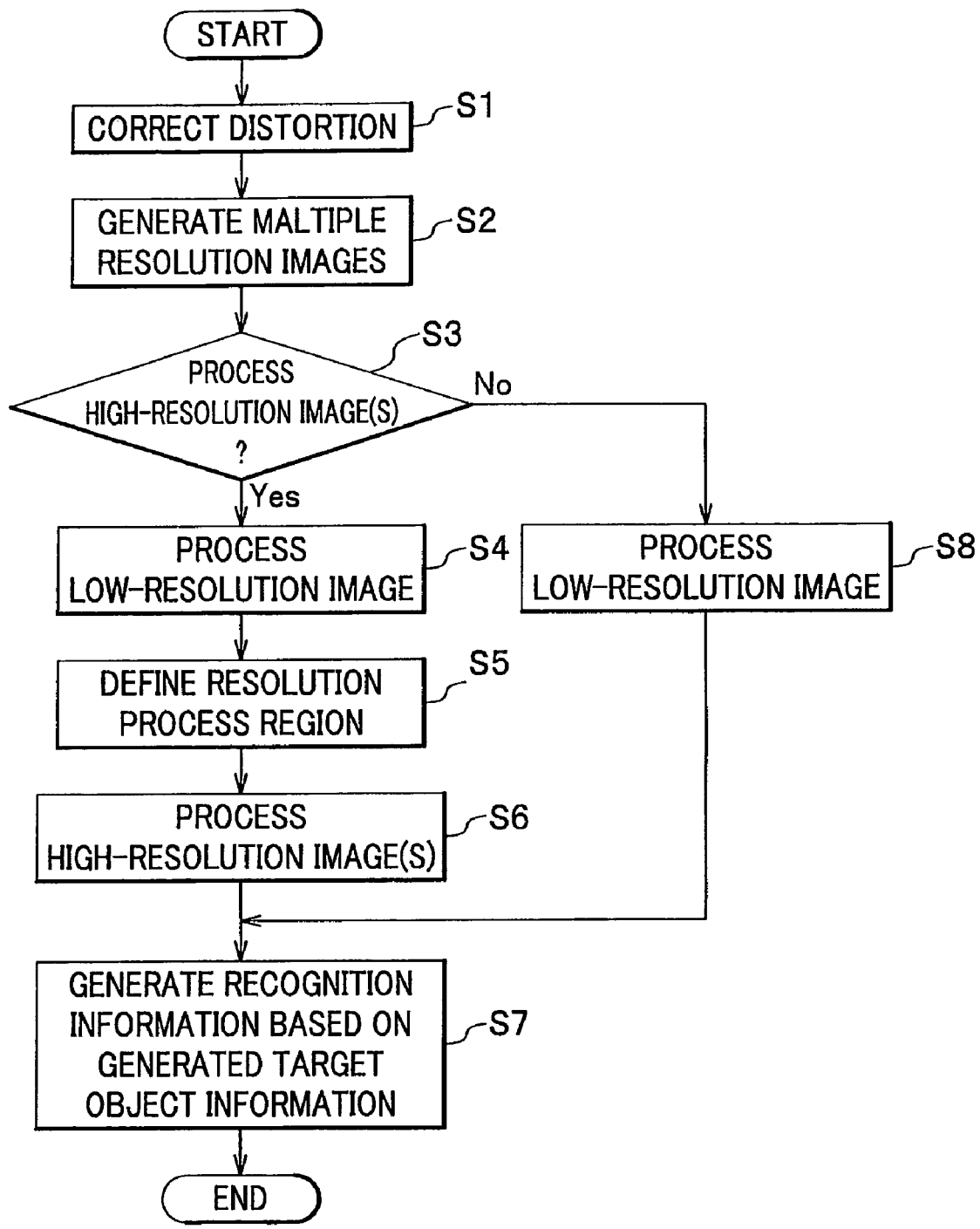

MOBILE ROBOT

CROSS-REFERENCE TO RELATED APPLICATION

This application claims the foreign priority benefit under 35 U.S.C. §119 of Japanese Patent Application No. 2007-316246 filed on Dec. 6, 2007, the disclosure of which is incorporated herein by reference.

BACKGROUND OF THE INVENTION

1. Field of the Invention

The present invention relates to a robot that is autonomously mobile, processes images acquired from a visual sensor, and generates recognition information regarding a target object to be recognized.

2. Description of the Related Art

Conventionally, there has been disclosed an invention that processes an input image only at a portion having features (interest portion) in higher resolution than the other portions in the image, thereby to provide an accurate recognition of a target object to be recognized (hereinafter referred to simply as a "target object") in the distance with less calculations. For example, the invention disclosed in JPH05-192895A process an image in higher resolution at a brightest point or darkest point of the image as the interest portion.

Such a robot disclosed in JP H05-192895A defines no interest region depending on the robot's movement, a position of a target object such as a human or an obstacle existing around the robot, or a task performed by the robot, which raises a problem that cannot secure a sufficient accuracy of target object recognition. For example, the robot disclosed in JP H05-192895A may defines a region of interest on a brightest point on the left side of the robot even when the robot turns right, which cannot secure sufficient recognition accuracy so that a smooth movement of the robot is hindered.

The present invention provides a mobile robot that is capable of desirably handling various situations including movements and or tasks performed by the robot, or target objects existing in the vicinity of the robot, with a higher accuracy in recognition of a target object as well as less calculations of image processing.

SUMMARY OF THE INVENTION

The present invention provides a mobile robot including an image processor that processes an image taken by a vision sensor and generates recognition information regarding a target object to be recognized included in the taken image, and a controller that integrally controls the mobile robot based on the generated recognition information, and the image processor includes: a multiple-resolution image generation unit that down-sizes the taken image to generate a low-resolution image having a resolution lower than that of the taken image and at least one high-resolution image having a resolution higher than that of the low-resolution image; a low-resolution image process unit that processes the low-resolution image generated by the multiple-resolution image generation unit, and generates first target object information regarding the target object included in the low-resolution image; an image-process determination unit that determines whether or not to process the high-resolution image in accordance with predetermined input information or a predetermined rule, also determines which high-resolution image having what resolution should be processed if the multiple-resolution image generation unit generates two or more high-resolution images, and then defines a resolution process region at part of the low-resolution image; a high-resolution image process unit that processes a region in the high-resolution region that corresponds to the resolution process region at part of the low-resolution image defined by the image-process determination unit so as to generate second target object information regarding the target object included in the high-resolution image; and an image-process result generation unit that determines whether or not the first target object information generated by the low-resolution image process unit and the second target object information generated by the high-resolution image process unit are met, and based on the determination of the first and second target object information, uses at least either of the first and the second target object information, thereby to generate the recognition information.

Other features and advantages of the present invention will become more apparent from the following detailed description of the invention when taken in conjunction with the accompanying exemplary drawings.

BRIEF DESCRIPTION OF THE DRAWINGS

FIG. 4 shows an example of task information database stored on storage of a management computer in FIG. 1.

FIG. 5 shows an example of a task schedule table stored on the storage of the management computer in FIG. 1.

FIG. 7 is a drawing showing an example of extracting face regions from a low-resolution image, according to the embodiment of the present invention.

FIG. 10 is a block diagram showing a configuration of a main controller of the robot in FIG. 6.

FIG. 11 is a flow chart showing various steps performed by an image processor in FIG. 6.

DETAILED DESCRIPTION OF THE PREFERRED EMBODIMENTS

Figure 1:
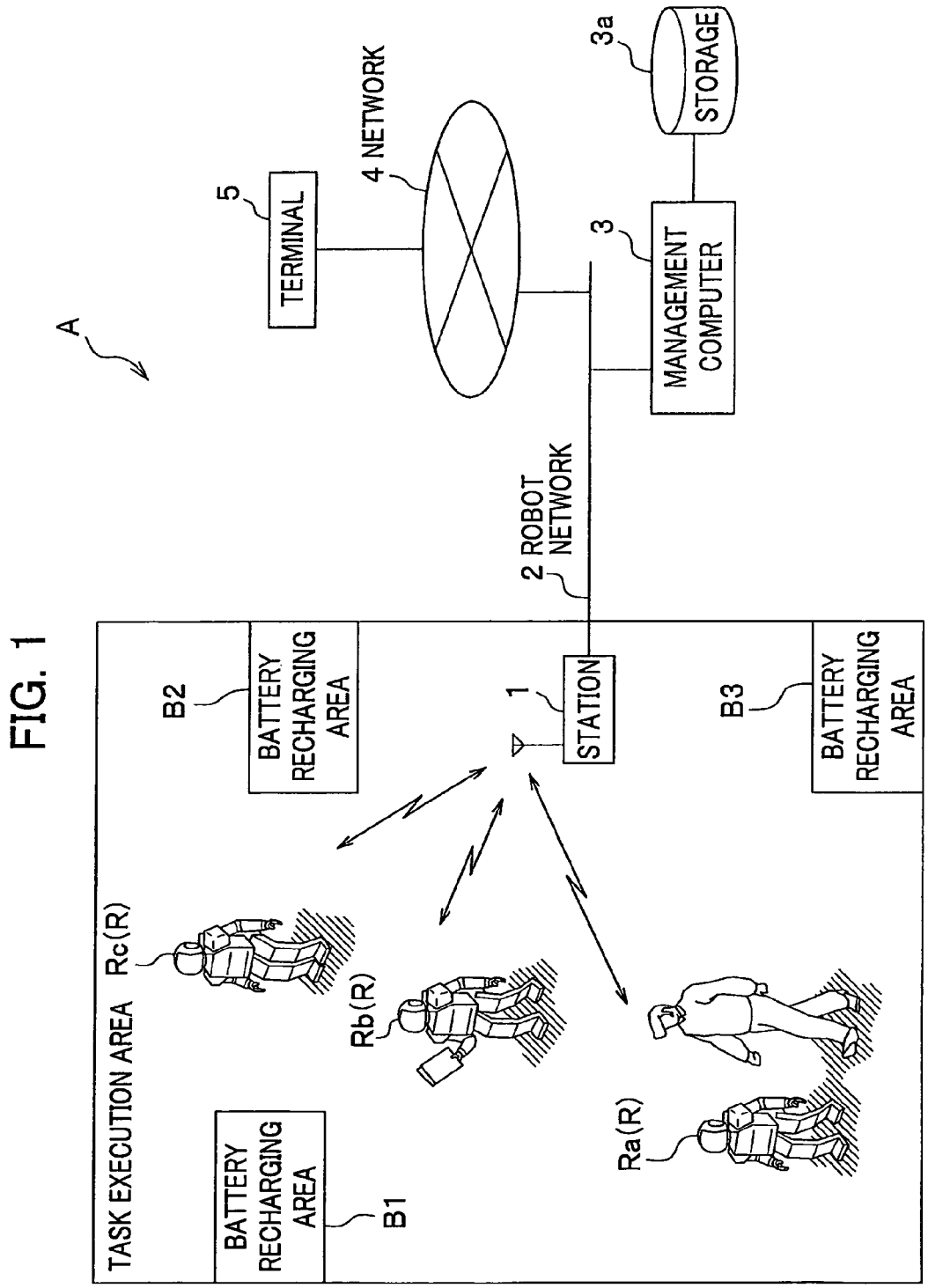
FIG. 1 is a schematic diagram of a configuration of a robot control system including a robot or robots, according to an embodiment of the present invention.

Hereinafter, with reference to the attached drawings, descriptions will be provided on an embodiment that implements a mobile robot (hereinafter referred to simply as a "robot") of the present invention. First, with dereference to FIG. 1, descriptions will be given on a general configuration of a robot control system A including the robot R according to the embodiment of the present invention. FIG. 1 shows a schematic diagram of the robot control system A including the robot R according to the embodiment of the present invention.

[Robot Control System]

As shown in FIG. 1, the robot control system A includes at least one robot R, a station 1 that is connected to the robot R via wireless communication, a management computer 3 connected to the station 1 via a robot network 2, and a terminal 5 that is connected to the management computer 3.

In FIG. 1, the robot control system A includes plural robots Ra, Rb, Rc (hereinafter referred to simply as the "robot R" unless otherwise stated), and each robot R executes a task in accordance with an execution plan of the task (task schedule) that is predefined for each robot R through the management computer 3.

Hereinafter, a two-leg type autonomous mobile robot will be described as an example of the invention.

The robot R executes a task in response to an execution instruction input from the management computer 3, and at least one robot R is located within a task execution area predefined as an area where the robot R executes the task.

In the case of FIG. 1, three robots R are illustrated: the robot Ra is executing a task to guide a visitor to a particular place such as a meeting room (guide task); the robot Rb is executing a task of carrying an article to a particular person (transportation task); and the robot Rc stays in the stand-by mode until a new task is given to.

Figure 2:
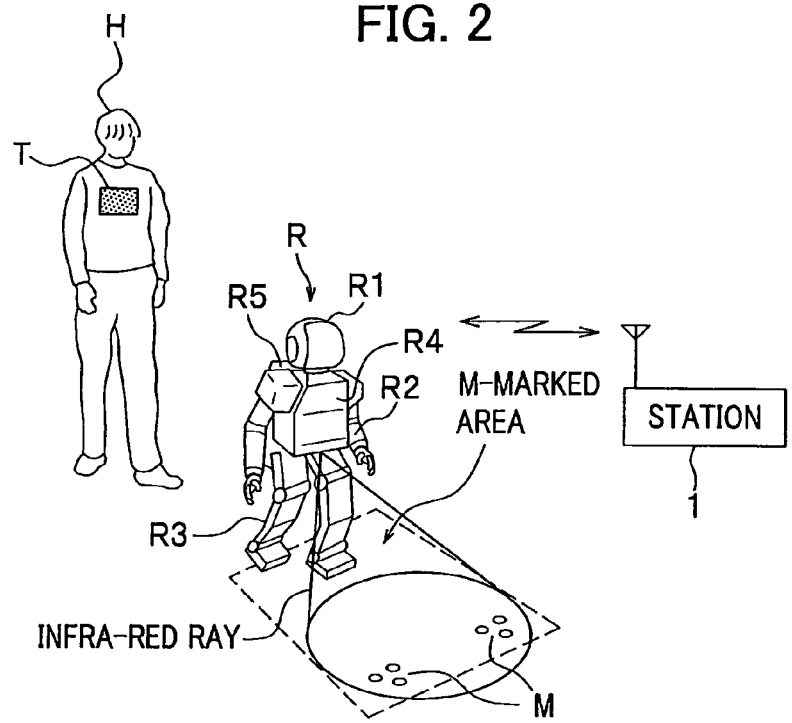
FIG. 2 is a schematic diagram showing an example of a self-position detection and an object detection executed by a robot according to the embodiment of the present invention.

As shown in FIG. 2, the robot R includes a head R1, arms R2, legs R3, a body R4 and a back housing section R5. The head R1, each arm R2 and each leg R3 are connected to the body R4, each of which is driven by respective actuators (driving means), and the robot R's bipedal walk is controlled by an autonomous motion control unit 50 (see FIG. 6). More details on such a robot's bipedal walk mechanism are described in JP 2001-62760A, for example.

When executing a guide task, for example, the robot R guides a person H in a predetermined guide area (e.g. movement area such as an office or a hallway). In this example, the robot R irradiates light (e.g. infrared ray, ultraviolet ray, leaser beam) and radio waves toward a circumference of the robot R, thereby to detect the person H wearing a tag T in the circumferential region, identify a position of the detected person H and approach to him or her, so that the robot R executes a personal identification to find who the person H is, based on the tag H. This tag T receives infrared ray and radio waves transmitted from the robot R for the sake of identifying the position (distance and orientation) of the person H. Based on signals regarding a light-receiving orientation included in the received infrared ray and the robot ID included in the received radio waves, the tag T generates a receiving report signal that includes the tag ID number and sends this receiving report signal back to the robot R. When receiving the receiving repot signal, the robot R recognizes the distance and orientation to the person H wearing the tag T, so that the robot R can approach this person H.

When the robot R autonomously moves within the guide area to execute a particular task (e.g. guide task or transport task), the robot R irradiates laser slit light or infrared ray, thereby to detect ground conditions or find marks provided on the ground (or floor) surface. Specifically, the robot R determines where itself moves within the movement area, and if the robot R determines itself moving within a regular movement area, the robot R irradiates laser slit ray onto the ground surface to detect steps, rolls or obstacles on the ground (or floor). If the robot R detects itself moving within an M-marked area, the robot R irradiates the infrared ray onto the ground surface to detect a mark M, so that the robot R recognizes and corrects its position and the like. The mark M may be, for example, made of reflective material that recursively reflects the infrared ray. The mark M includes position data, and this position data is virtually included in map data, and actually stored on the storage 30 (see FIG. 6). The map data includes the position data regarding the mark M provided on a predetermined position within the guide area, as well as data regarding an M-marked area, which has a predetermined broader range in addition to the mark M position. The M marked area refers to an area defined with a predetermined distance from the mark M; for example, a circular area with a radius of 1 to 3 m from the mark M as a center; a rectangular area extending 3 m (toward the robot R side) from the mark M, or the like.

Returning to FIG. 1, descriptions will be given on the configuration of the robot control system A.

The station 1 relays data exchange between the robot R and the management computer 3. Specifically, the station 1 sends an execution instruction output from the management computer 3 to the robot R, and also receives data regarding the robot R's conditions and a signal representing that the robot R has received the execution instruction (i.e. receiving report signal) from the robot R, and then outputs the signal received to the management computer 3.

As for the station 1, at least one station 1 may be provided in each task execution area to ensure a stable data exchange between the robot R and the management computer 3.

In some case, a task execution area may be located across multiple floors in the building. In such a case, the task execution area may preferably be divided into multiple sub-areas, so that each floor may have a single sub-area. If a single station 1 cannot cover the whole task area, multiple stations 1 may be provided across the task area.

The station 1, the management computer 3 and the network 4 are connected with one another through the robot network 2, which may be implemented using LAN (Local Area Network), for example.

The management computer 3 manages at least one robot R, and provides various controls on the robot R's actions, movements, speech etc., via the station 1 and the robot network 2, as well as providing information necessary for the robot R. Note that this necessary information may includes a detected person's name and maps in the vicinity of the robot R, etc, and such information is stored on the storage 3a of the management computer 3.

Figure 3:
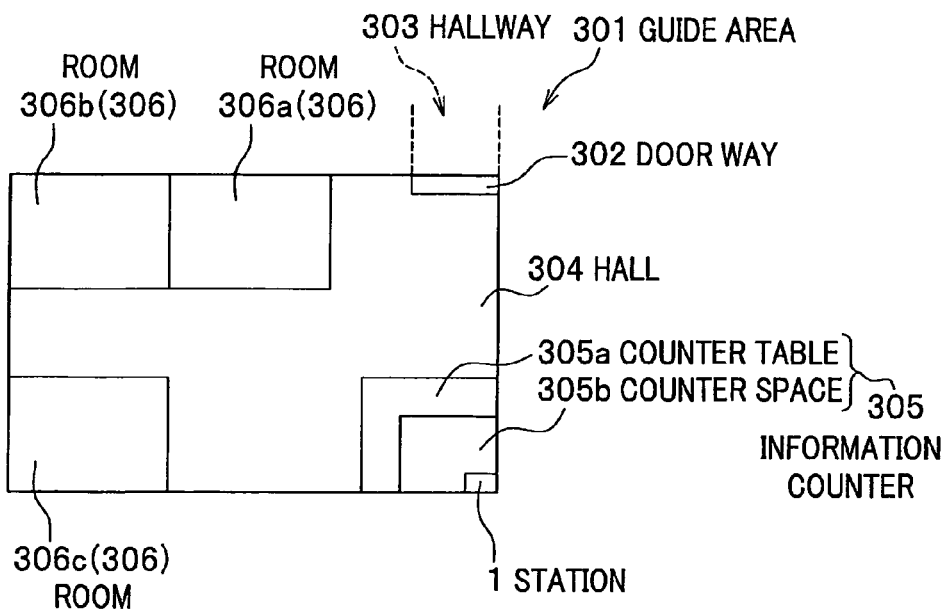
FIG. 3 is a drawing showing an example of a local map used in the robot control system in FIG. 1

FIG. 3 is a drawing that shows an example of a local map used in the robot control system A of FIG. 1. In this example, the guide area 301 is a rectangular area on a particular floor in a building, as seen in FIG. 3A. The robot R and a person H guided by the robot R enter through a hallway 303 outside a door way 302 of a guide area 301 into this guide area 301. Inside the door way 302, the hall 304 stretches out, and there is an information counter 305 at the back corner of the hall 304, and there are multiple meeting rooms 306 (306a, 306b, 306c) partitioned as a separate room along the wall side of the guide area 301. The information counter 305 includes an L-shaped counter table 305a and a counter space 305b where a clerk serves. There is provided the station 1 in the counter space 305b. The management computer 3 stores on the storage 3a (see FIG. 1), local maps (local map data) that associate locational information regarding hallways and rooms, etc. with corresponding positional coordinates, as well as a global map that is map information regarding task execution areas build up with the above local maps.

The management computer 3 also stores on the storage 3a (see FIG. 1) the task information database 400 storing information regarding tasks executed by the robot R (task data).

As shown in FIG. 4, the task information database 400 includes various information items, such as: a task ID as an identifier uniquely assigned to each task; priority of a task; importance of a task; a robot ID as an identifier uniquely assigned to each robot, which is used when instructing the robot to execute a task; task content representing such as "guide", "transport (transport of an article)", etc.; a start point to start a task in the task execution area; an end point to end a task in the task execution area; time required for executing the task; a scheduled start time to start a task (start time); a scheduled end time to end a task (end time); and status of a task.

The management computer 3 also assigns to each robot R a task execution plan (task schedule) that schedules the robot R to execute a task.

As shown in FIG. 5, the task schedule table 500 includes various information items, such as: priority order of tasks to be executed by the robot R; a task ID to identify a specific task included in the task information database 400 (see FIG. 4); priority of a task; content of a task; and status of a task.

The task schedule table 500 includes these information items arranged for each robot R, so as to understand what task is assigned to which robot R in what priority order.

Returned to FIG. 1, descriptions will be provided on the configuration of the robot control system A.

The terminal 5 is connected to the management computer 3 via the network 4, registers information regarding persons, and or modifies the registered information on the storage 3a. The terminal 5 also registers a task to be executed by the robot R, changes a task schedule that is defined on the management computer 3, and inputs instructions regarding the robot R's actions.

[Robot]

Hereinafter, descriptions will be provided on the robot R.

The robot R includes cameras C, C, a speaker S, microphones MC, MC, an image processor 10, an audio processor 20, a storage 30, a main controller (also referred to as a "controller") 40, an autonomous motion control unit 50, a wireless communication unit 60, a battery 70, an object detector 80 and a circumference sensor 90, as well as the head R1, each arm R2, each leg R3, the body R4 and the back housing section R5.

The robot R further includes a gyro sensor SR1 that detects an orientation in which the robot R heads, and a GPS (Global Positioning System) receiver SR2 for acquiring positional coordinates that identifies a current position of the robot R on a predetermined map.

[Cameras]

The cameras (also referred to as a "vision sensor") C, C, capture digital data on images in the proceeding direction ahead of the robot R, and a color CCD (Charge-coupled Device) may be used as the cameras C, C. The cameras C, C are disposed on the right and left sides in pair at the same height level, and output captured images to the image processor 10. The cameras C, C, the speaker S and the microphones MC, MC are provided in the head R1. The speaker S (also referred to as an "audio output means") utters predetermined voices synthesized in the audio processor 20.

[Image Processor]

The image processor 10 processes images taken by the cameras C, C, and recognizes a target object, such as an obstacle or a person in the vicinity of the robot R, based on the taken images, so as to grasp circumstantial conditions of the robot R. The image processor 10 includes a multiple-resolution image generation unit 11, a low-resolution image process unit 12, an image-process determination unit 13, a high-resolution image process unit 14, and an image-process result generation unit 15.

The multiple-resolution image generation unit 11 downsizes an image taken by the camera C and generates a low-resolution image whose resolution is lower than that of the original image taken by the camera C (also referred to simply as an "original image" or a "taken image"), and at least one high-resolution image whose resolution is higher than that of this low-resolution image. Specifically, when downsizing an image, the multiple-resolution image generation unit 11 corrects a distortion of the image taken by the camera C and downsizes the image by averaging 2×2 pixels into a single pixel, or removing pixels at specified intervals. The multiple-resolution image generation unit 11 outputs a low-resolution image to the low-resolution image process unit 12, and a high-resolution image to the image-process determination unit 13, as well.

For example, if each camera C takes an image with 1280× 960 pixels, the multiple-resolution image generation unit 11 generates two different images having different resolutions respectively, i.e., a low-resolution image downsized to 640× 480 pixels and a high-resolution image of the original image.

The multiple-resolution image generation unit 11 may also generate three or more different images having different resolutions, respectively. For example, the multiple-resolution image generation unit 11, using the original image, may generate three different images: a low-resolution image downsized to 640×480 pixels, a high-resolution image (medium) downsized to 800×600 pixels and a high-resolution image (high) that is the original image.

Note that a target object may be a person, an obstacle, a tag attached on an object to be detected, or a transport container on which articles are placed. Target object information includes various information regarding a target object, such as type of a target object, orientation of a target object, distance to a target object, face region of a person, and region of a target object in an image.

The low-resolution image process unit 12 processes a low-resolution image generated by the multiple resolution image generation unit 11, and generates target object information regarding a target object in the low-resolution image (also referred to as a "first target object information"). Note that the low-resolution image process unit 12 processes an image having the lowest resolution among images generated by the multiple-resolution image generation unit 11.

In addition, the low-resolution image process unit 12 generates a pair of low-resolution images from two original images from the cameras C, C on the right and left. The low-resolution image process unit 12 also calculates a parallax between each pair of pixels included in the low-resolution images in pair based on the block correlation, so as to generate a parallax image from the low-resolution images in pair. Note that this calculated parallax represents a distance from the Robot R to the target object whose images are taken by the cameras C, C. If information regarding a distance to the target object is not necessary, the low-resolution image process unit 12 may process only either of the low-resolution images in pair.

The low-resolution image process unit 12 stores several frames of past images to extract a moving target object, and calculates a displacement of each pixel across those frames of the past images by using a predetermined correlation algorithm or the like, thereby to generate a motion image. Based on the above parallax and motion images, if there are pixels having greater displacements in a predetermined distance range from the cameras C, C, the low-resolution image process unit 12 estimates that there is a person, and extracts part of the parallax only defined in the predetermined distance range from the cameras C, C, as a moving target object.

The low-resolution image process unit 12 determines a head region in the moving target object extracted from the low-resolution image, from which a face region and a face position are identified. Similarly, a hand position may further be identified based on a size and or a shape at part of the extracted moving target object. Details of how to determine a person's face region is disclosed in JP2006-171929A, for example.

Next, the low-resolution image process unit 12 extracts an obstacle (target object) in such a manner that the process unit 12 generates an edge-detected image by detecting edges in the low-resolution image, or generates a binary image by converting each pixel into a white or black color based on the density values of the image. In addition, if the robot R transports an article (i.e. executes a transport task), the low-resolution image process unit 12 extracts a transport container on which the article is placed from the low-resolution image.

The low-resolution image process unit 12 outputs data regarding the face region of the person or the transport container as extracted above, as input information, to the image-process determination unit 13, and also outputs target object information generated based on this extract data to the image-process result generation unit 15.

The image-process determination unit 13 determines whether or not to process a high-resolution image in accordance with the predetermined input information or the predetermined rule, also determines which high-resolution image having what resolution should be processed if two or more high-resolution images with different resolutions have been generated by the multiple-resolution image generation unit 11, and defines a resolution process region at part of the low-resolution image. The image-process determination unit 13 outputs the high-resolution image having the resolution determined to be processed and the resolution process region as defined above to the high-resolution image process unit 14. Meanwhile, if the image-process determination unit 13 determines not to process any high-resolution image, the process unit 13 outputs this determined result to the image-process result generation unit 15.

Hereinafter, specific descriptions will be provided on the above-mentioned determination and the definition of the resolution process region by the image-process determination unit 13 according to the embodiment of the present invention, with reference to the following variations 1 to 11. Note that, in the following examples, descriptions will be omitted on a sound-source position determination unit 21c, a main controller 40, an internal condition detection unit 45, a behavior plan management unit 46 and an object detector 80 and others, but will be described later on.

<Variation 1: Defining Resolution Process Region at Center>

The image-process determination unit 13 defines the resolution process region at a center of the low-resolution image in accordance with a predetermined rule. In this example, the image-process determination unit 13 defines, for example, a rectangular resolution process region with 200 (horizontal)× 100 (vertical) pixels at the center of the low-resolution image.

In this case, no input information is input; therefore, the image-process determination unit 13 defines the resolution process region in accordance with the following rules: for example, the image-process determination unit 13 keeps the resolution process region as defined while the robot R is operating. Alternatively, the image-process determination unit 13 may define the resolution process region only when the robot R moves, and when the robot R stops, the defined resolution process region may be canceled. Further alternatively, the resolution process region is defined once, and thereafter, this resolution process region defined may be canceled if no target object is recognized in a predetermined time period. The image-process determination unit 13 determines to process a high-resolution image when the resolution process region is defined, and determines not to process a resolution process region when the defined resolution process region is canceled.

The resolution process region is not limited to a specific size (area) and shape, and may be formed in a rectangle, circular or horizontally ellipsoid shape.

<Variation 2: Repeatedly Defining Resolution Process Region in Horizontal Direction>

The image-process determination unit 13 repeatedly defines the resolution process region, shifting this region in the horizontal direction in accordance with a predetermined rule. In this example, first, the image-process determination unit 13 defines the resolution process region at a center of the previous frame of the low-resolution image, and then horizontally shifts the region toward the right or left side in the next frame of the low-resolution image by the predetermined number of pixels. The image-process determination unit 13 repeats this step until the resolution process region reaches the right or left end of the low-resolution image. When the resolution process region reaches the right or left end of the low-resolution image, the image-process determination unit 13 may once again define the resolution process region at the center of the low-resolution image, and then re-shift this region toward the reverse direction until the region reaches the other end of the image.

Alternatively, the image-process determination unit 13 may define the resolution process region at the right or left end of the low-resolution image in advance, and then shift the resolution process region toward the other end of the image.

The resolution process region is not limited to a specific size and shape, and may be formed in a rectangle, circular or horizontally ellipsoid shape.

<Variation 3: Defining Resolution Process Region on Face Region of Person>

The image-process determination unit 13 may define the resolution process region on an extracted face region of a person extracted by the low-resolution image process unit 12. FIG. 7 shows an example of face regions extracted from the low-resolution image by the low-resolution image process unit 12. In this example, the low-resolution image process unit 12 generates a face region image including four face regions extracted. When the generated face region images are input to the image-process determination unit 13, then the image-process determination unit 13 defines these face regions to be the resolution process region (see non-meshed portions in FIG. 8).

The image-process determination unit 13 may define more than one resolution process region in the low-resolution image.

<Variation 4: Defining Resolution Process Region Depending on Future Traveling Direction>

The image-process determination unit 13 defines the resolution process region depending on the future traveling direction. In this example, if the robot R's future traveling direction is straightforward; that is, the robot R is scheduled to advance straightforward from now, the image-process determination unit 13 defines the resolution process region at the center of the low-resolution image. Then, when the robot R's future traveling direction is toward the right side; that is, the robot R is scheduled to turn to the right from now, the image-process determination unit 13 defines the resolution process region on the right side of the low-resolution image. When the robot R's future traveling direction is toward the left side this time; that is, the robot R is scheduled to turn to the left from now, the image-process determination unit 13 defines the resolution process region on the left side of the low-resolution image.

If there is only a small difference in angle between the direction in which the robot R currently faces and the future traveling direction in which the robot R will travel, that is, if the robot R's turning angle is relatively small, the image-process determination unit 13 shifts the resolution process region from the center of the low-resolution image a little toward the traveling direction; or otherwise, if the robot R's turning angle becomes relatively great, the image-process determination unit 13 defines the resolution process region to get closer toward an either (right or left) end of the low-resolution image in the traveling direction.

If the robot R turns so greatly that the robot R's traveling direction may deviate out of the photographable range of the cameras C, C. In such a case, the image-process determination unit 13 defines the resolution process region at either (right or left) end of the low-resolution image in the future traveling direction. Defining the resolution process region in such a way, simply turning the robot R's head R1 to the traveling direction enables a rapid recognition of a target object in the future traveling direction, as well as reducing at minimum the turning rate of the robot R itself when recognizing the target object.

In this case, the behavior plan management unit 46 outputs to the image-process determination unit 13 the robot R's future traveling direction as input information based on the robot R's behavior plan managed by the unit 46. Alternatively, the autonomous motion control unit 50 may output to the image-process determination unit 13 the input traveling direction of the robot R as input information.

As shown in FIG. 4, the main controller 40 acquires a task that is currently being executed from the task information database 400 of the management computer 3, and obtains a future traveling direction of the robot R. The main controller 40 determines, for example, that a direction in which the end point included in the task is viewed from the robot R's current point should be the robot R's future traveling direction, and outputs this determined direction as input information to the image-process determination unit 13.

The information regarding the robot R's current orientation is input via the main controller 40 from the gyro sensor SR1, and the information regarding the robot R's current point is input via the main controller 40 from the GPS receiver SR2.

<Variation 5: Defining Resolution Process Region Depending on Future Traveling Speed>

The image-process determination unit 13 may be configured to be more likely to determine to process a higher-resolution image and narrow the resolution process region as the input traveling speed or the future traveling speed becomes faster. Such a determination more likely to process a higher-resolution image as the input traveling speed or the future traveling speed becomes faster is for the sake of enhancing accuracy in recognition of the target object in the distance. In this case, the resolution process region is defined depending on the robot R's future traveling direction.

If the multiple-resolution image generation unit 11 generates two different images, the image-process determination unit 13 may determine in such a manner:
not to process a high-resolution image while "stopping"
to process a high-resolution image while "walking"
to process a high-resolution image while "running"
If the multiple-resolution image generation unit 11 generates three different images, the image-process determination unit 13 may determine in such a manner:
not to process a high-resolution image while "stopping"
to process a high-resolution image (medium) while "walking"
to process a high-resolution image (high) while "running"
In this case, the image-process determination unit 13 defines the resolution process region to be a rectangle of 200 (horizontal) ×100 (vertical) pixels while the robot R is walking, and to be a rectangle of 100 (horizontal) ×50 (vertical) pixels while the robot R is running. Although processing a high-resolution image, since the resolution process region is defined to be narrower, thereby to reduce the calculations by the high-resolution image process unit 14.

Specific examples of the robot R's future traveling speed will be shown as follows, and this is the same as the case of the input traveling speed:
Future traveling speed (input traveling speed)=0(m/s) while "stopping"
0(m/s)<future traveling speed (input traveling speed)≦3 (m/s) while "walking"
Future traveling speed (input traveling speed)>3(m/s) while "running"

The behavior plan management unit 46 outputs to the image-process determination unit 13 the robot R's future traveling speed from the behavior plans managed by the unit 13 as input information. Alternatively, the autonomous motion control unit 50 may output to the unit 13 the input traveling speed of the robot R as input information.

In this case, as shown in FIG. 4, the main controller 40 acquires a task currently being executed from the task information database of the management computer 3, and obtains the future traveling speed of the robot R. For example, the main controller 40 finds a traveling distance based on a difference in distance between the start point and the end point included in the task, and outputs a value obtained by dividing the found traveling distance by the required time as input information (future traveling speed) to the image-process determination unit 13.

<Variation 6: Defining Resolution Process Region Depending on Direction of Sound Source>

The image-process determination unit 13 defines the resolution process region depending on the direction of a sound source that is input. If the direction of the sound source is located straight ahead of the head R1 of the robot R, the image-process determination unit 13 defines the resolution process region at the center of the low-resolution image. If the direction of the sound source is located on the right side of the head R1, the image-process determination unit 13 defines the resolution process region on the right side of the low-resolution image. If the direction of the sound source is located on the left side of the head R1, the image-process determination unit 13 defines the resolution process region on the left side of the low-resolution image.

If there is a small difference in angle between the direction where the head R1 heads and the direction of the sound source, the image-process determination unit 13 shifts the resolution process region from the center of the low-resolution image a little toward the direction of the sound source. Otherwise, if there is a greater difference in between the direction where the head R1 heads and the direction of the sound source, the image-process determination unit 13 defines the resolution process region to get closer toward an either (right or left) end of the low-resolution image in direction of the sound source.

In some case, the sound source may be located on the back side of the robot R, and deviate out of the photographable range of the cameras C, C. In such a case, the image-process determination unit 13 defines the resolution process region at either (right or left) end of the low-resolution image in the future traveling direction. Defining the resolution process region in such a way, simply turning the head R1 of the robot R to the direction of the sound source enables a rapid recognition of the target object in the direction of the sound source, as well as making at minimum the turning rate of the robot R itself when recognizing the target object.

The main controller 40 outputs to the image-process determination unit 13 the direction and the sound pressure of the sound source that are identified by the sound-source position determination unit 21c as input information. In order to obtain the head R1's current heading direction, information regarding the head R1's current heading direction acquired from the autonomous motion control unit 50 can be added to the above mentioned information regarding the robot R's current heading direction.

<Variation 7: Changing Resolution Depending on Sound Pressure>

The image-process determination unit 13 may be configured to be more likely to determine to process a higher-resolution image and narrow the resolution process region as the input sound pressure becomes smaller. This determination relies on an assumption that a smaller sound pressure means a longer distance to a sound source of a target object. In this case, the resolution process region may be defined depending on the direction of the sound source.

If the multiple-resolution image generation unit 11 generates two different images, the image-process determination unit 13 determines as follows:
Low sound pressure: to process a high-resolution image
Intermediate sound pressure: to process a high-resolution image
High sound pressure: not to process a high-resolution image
If the multiple-resolution image generation unit 11 generates three different images, the image-process determination unit 13 determines as follows:
Low sound pressure: to process a high-resolution image (high)
Intermediate sound pressure: to process a high-resolution image (medium)
High sound pressure: not to process a high-resolution image The image-process determination unit 13 defines the resolution process region to be a rectangle of 200 (horizontal)×100(vertical) pixels if the sound pressure is low; and defines the resolution process region to be a rectangle of 100 (horizontal)×50(vertical) pixels if the sound pressure is medium. Examples of various sound levels are shown as follows:
Low sound pressure: sound pressure≦20 (dB)
Medium sound pressure: 20 (dB)<sound pressure≦60 (dB)
High sound pressure: sound pressure>60 (dB)

<Variation 8: Defining Resolution Depending on Direction of Tag>

Figure 8:
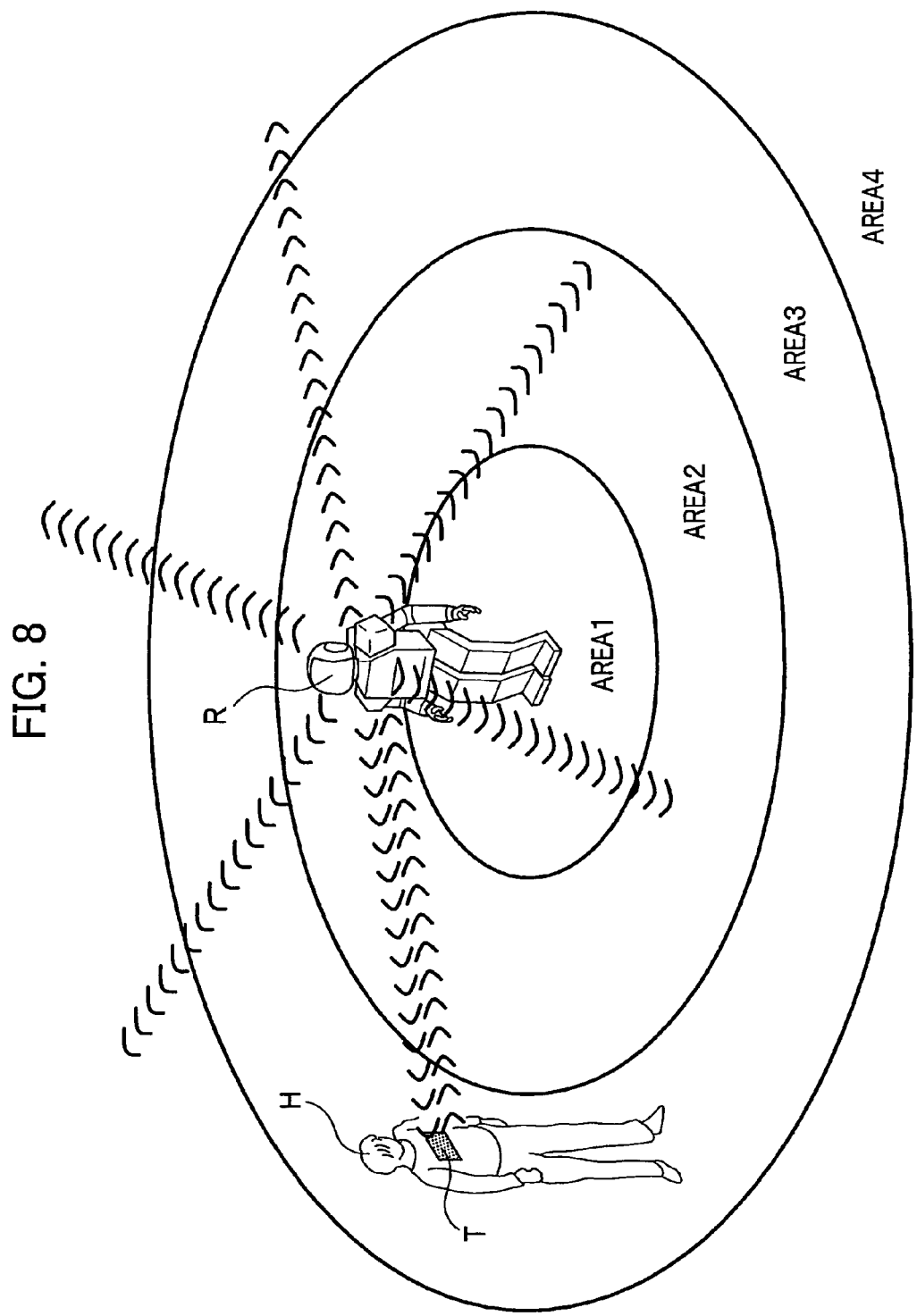
FIG. 8 is a drawing explaining how to acquire information indicating in which area a person exists based on the radio filed intensity, according to the embodiment of the present invention.

The image-process determination unit 13 defines the resolution process region depending on the input direction of a tag T. As shown in FIG. 8, when a tag attached on an object to be detected (person H) is located straight ahead of the head R1 of the robot R, the image-process determination unit 13 defines the resolution process region at the center of the low-resolution image; if the direction of the tag T is located on the right side of the head R1, the image-process determination unit 13 defines the resolution process region on the right side of the low-resolution image; and if the direction of the tag T is located on the left side of the head R1, the image-process determination unit 13 defines the resolution process region on the left side of the low-resolution image.

If there is a small difference in angle between the direction in which the head R1 faces and the direction of the tag T, the image-process determination unit 13 shifts the resolution process region from the center of the low-resolution image a little toward the direction of the tag T. Otherwise, if there is a relatively great difference in angle between the robot R's current facing direction and the direction to the tag, the image-process determination unit 13 defines the resolution process region to get closer toward an either (right or left) end of the low-resolution image in the direction of the tag T.

If the person H wearing the tag T is located behind of the robot R or the like, the tag T may deviate out of the photographable range of the cameras C, C. In such a case, the image-process determination unit 13 defines the resolution process region at either (right or left) end of the low-resolution image in direction of the tag T side. Defining the resolution process region in such a way, simply turning the robot R's head R1 toward the direction of the tag T enables a rapid recognition of the person H in direction of the tag T, as well as making the turning rate of the robot R itself at minimum when recognizing the person H.

The main controller 40 outputs to image-process determination unit 13 the direction and the distance to the tag T detected by the object detector 80 as input information.

<Variation 9: Changing Resolution Depending on Distance to Tag>

The image-process determination unit 13 may be configured to be more likely to determine to process a higher-resolution image and narrow the resolution process region as the distance to the tag T that is input becomes greater. As shown in FIG. 8, the vicinity area of the robot R is classified into four areas based on the distance from the robot R. Specifically, in the order of shorter to longer distance from the robot R, the vicinity area is classified into the area 1, the area 2, the area 3 and the area 4. These areas are previously related to the respective radio filed intensities (i.e. distances to the tag T detected by the object detector 80). In this case, the resolution process region is defined depending on the direction of the tag T.

If the multiple-resolution image generation unit 11 generates two different images, the image-process determination unit 13 determines as follows:
Area 1: not to process a high-resolution image
Area 2: not to process a high-resolution image
Area 3: to process a high-resolution image
Area 4: to process a high-resolution image
If the multiple-resolution image generation unit 11 generates three different images, the image-process determination unit 13 determines as follows:
Area 1: not to process a high-resolution image
Area 2: to process a high-resolution image (medium)
Area 3: to process a high-resolution image (medium)
Area 4: to process a high-resolution image (high)

In this case, the image-process determination unit 13 defines the resolution process region to be a rectangle of 200 (horizontal)×100 (vertical) pixels in the area 2, to be a rectangle of 150 (horizontal)×75 (vertical) pixels in the area 3, and to be a rectangle of 100 (horizontal)×50 (vertical) pixels in the area 4.

<Variation 10: Defining Resolution Process Region in Accordance with Transport Task>

The image process-determination unit 13 determines whether or not the current task executed by the robot R is a transport task. Now, the main controller 40 acquires a current task currently being executed from the task information database 400 of the management computer 3, and outputs the content (type) of this acquired task to the image-process determination unit 13. Alternatively, the internal condition detection unit 45 outputs the task content stored in the status information to the image-process determination unit 13. Based on the task content, the image-process determination unit 13 determines whether or not the robot R is currently executing the transport task. Then, the image-process determination unit 13 defines the resolution process region on a transport container extracted by the low-resolution image process unit 12.

Figure 9:
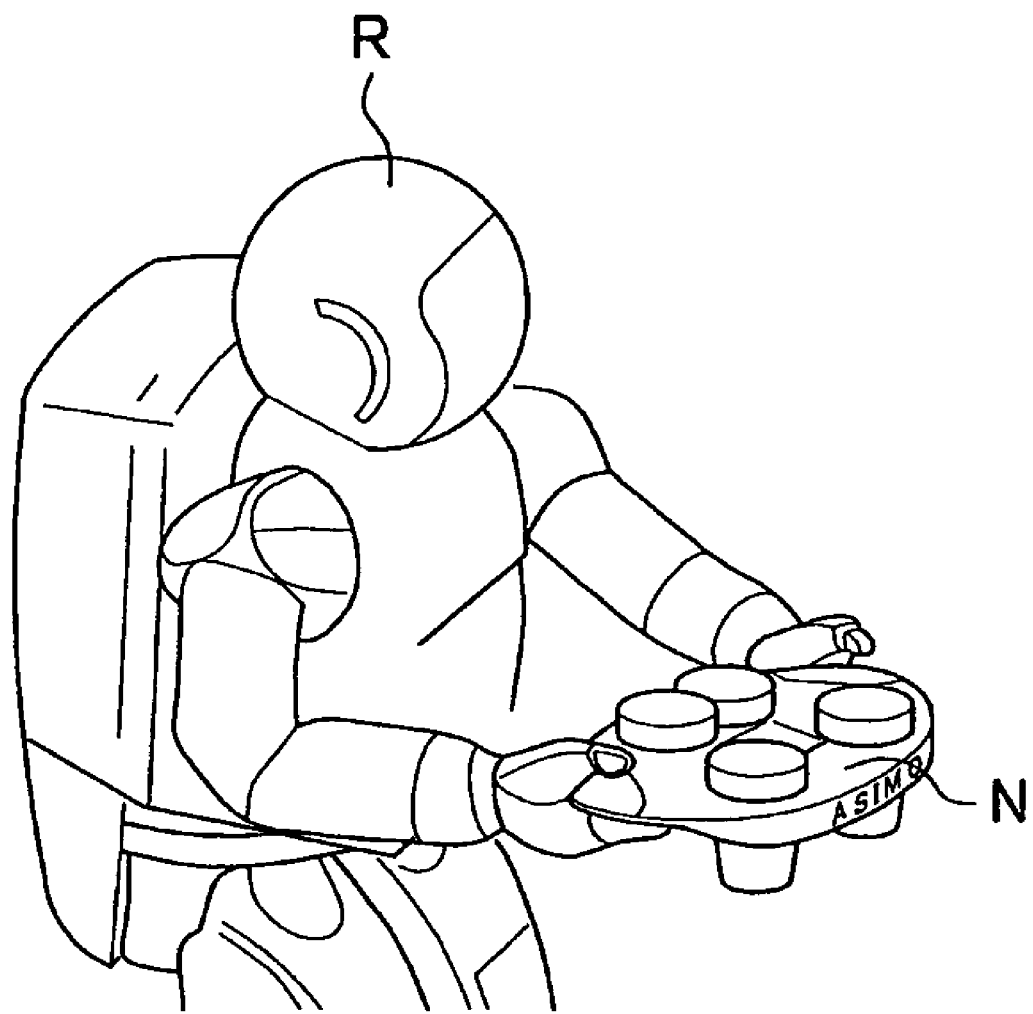
FIG. 9 is a drawing explaining an example of how a transport task is executed by the robot according to the embodiment of the present invention.

As shown in FIG. 9, the robot R transports an article on a predetermined transport container N (tray). There may be provided a predetermined pattern on the surface of the transport container N so that the robot R can easily recognize the image. FIG. 9 shows an example of a particular logo provided on the transport container as the predetermined recognition pattern. However, the recognition pattern is not limited to this, and may be any mark or pattern in any color which is different from the base color of the transport container N. For the sake of recognition, the transport container N may preferably have a color different from a surface color of a place where the transport container N is placed. Details of such a transport of an article by the robot R are disclosed in JP 2007-160447 A, for example.

<Variation 11: Defining Resolution Process Region in Accordance with Guide Task>

The image-process determination unit 13 determines whether or not the task being currently executed by the robot R is a guide task, and defines the resolution region depending on the direction of guiding a person H. Now, the main controller 40 acquires the current task being executed from the task information database 400 of the management computer 3, and outputs the content of the acquired current task to the image-process determination unit 13. Based on the acquired task content, the image-process determination unit 13 determines whether or not the robot R is currently executing the guide task. Then, as input information, the image-process determination unit 13 defines the resolution process region at the guiding end point (see FIG. 4) included in the input information that is stored in the current task. Details of such a guide task by the robot R to guide the person H are disclosed in JP 2004-299026A, for example.

Figure 6:
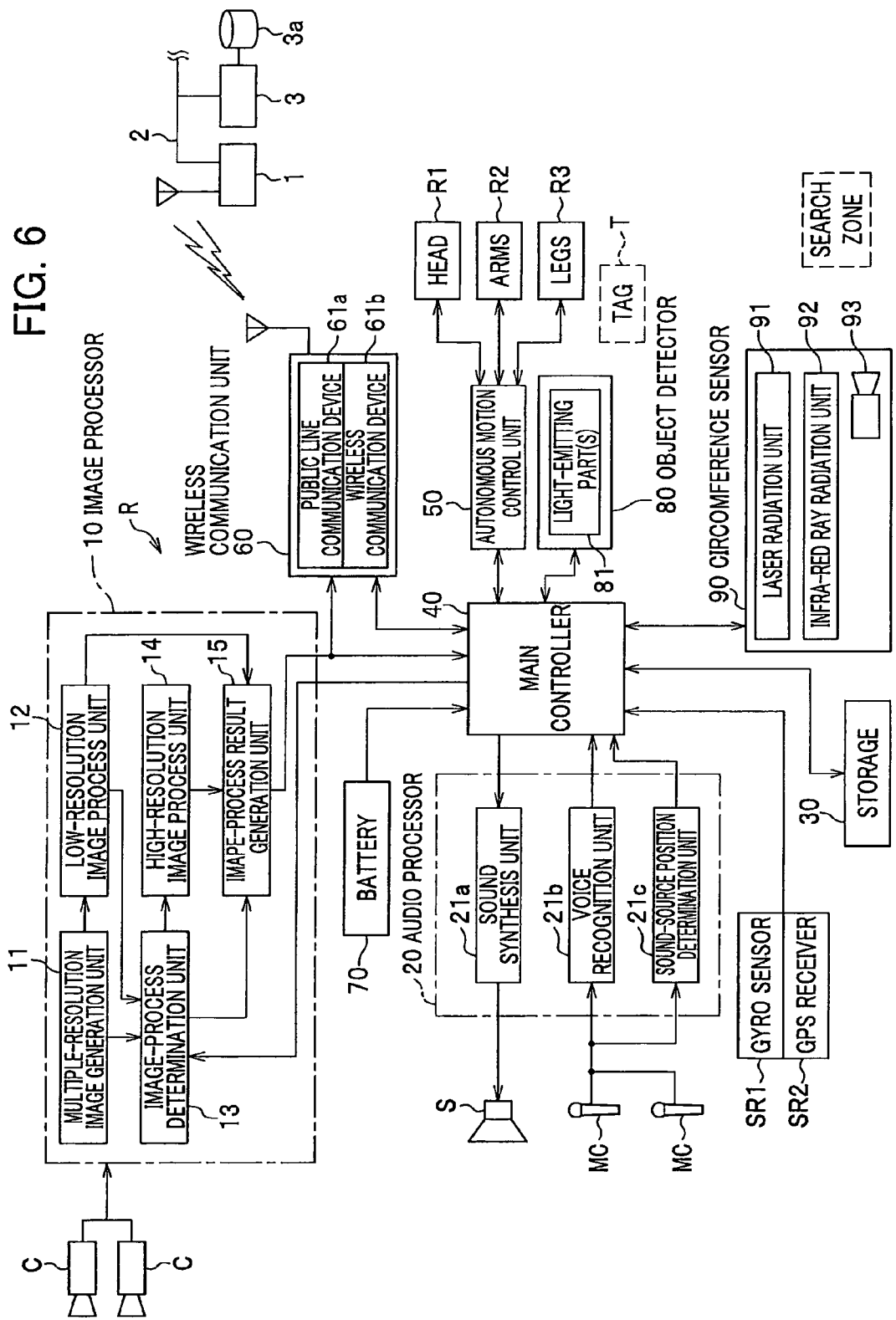
FIG. 6 is a block diagram showing a configuration of the robot according to the embodiment of the present invention.

Returned to FIG. 6, the high-resolution image process unit 14 processes a region in the high-resolution image that corresponds to the resolution process region at part of the low-resolution image defined by the image-process determination unit 13, and generates target object information regarding the target object included in the high-resolution image (also referred to as a "second target object information").

Now, as similar to the low-resolution image process unit 12, the high-resolution image process unit 14 executes various steps of generating parallax image, extracting a moving target object, recognizing a face region of a person, generating an edge-detected image and generating a binary image, etc., so as to generate target object information, which is output to the image-process result generation unit 15.

The image-process result generation unit 15 determines whether or not the target object information (first target object information) generated by the low-resolution image process unit 12 and the target object information (second target object information) generated by the high-resolution image process unit 14 are met. Based on this determination, if both pieces of the target object information are matched, they are used to generate the recognition information. If both pieces of the target object information are not matched, only the target object information generated by the high-resolution image process unit 14 is used to generate the recognition information.

For instance, if the target object information generated by the low-resolution image process unit 12 indicates: "there is an obstacle 5 meters straight ahead of the robot R", and target object information generated by the high-resolution image process unit 14 indicates: "there is an obstacle 10 meters straight ahead of the robot R", this means that both pieces of the information are not matched. In such a case, the image-process result generation unit 15 generates recognition information by using only the target object information generated by the high-resolution image process unit 14. In this case, the image-process result generation unit 15 generates such recognition information that indicates: the type of the target object is an obstacle, the distance to the target object is 10 meters, and the target object exists straight ahead of the robot R (a direction of the target object relative to the robot R's heading direction), and outputs this generated recognition information to the main controller 40.

Meanwhile, if the target object information of the low-resolution image process unit 12 and the target object information of the high-resolution image process unit 14 are matched, the image-process result generation unit 15 uses both pieces of the target object information indicating the identical content and outputs recognition information to the main controller 40.

If the image-process determination unit 13 determines not to process a high-resolution image, the image-process result generation unit 15 uses target object information generated by the low-resolution image process unit 12, so as to generate recognition information, and outputs it to the main controller 40. In this case, the recognition information includes variety of information regarding a target object, such as a type, direction and distance to a target object, a face region of a person and a region of the target object in an image, etc.

[Audio Process Unit]

The audio processor 20 includes an audio synthesis unit 21a, voice recognition unit 21b and sound-source position determination unit 21c. Based on the instruction regarding speech behavior defined and output by the main controller 40, the audio synthesis unit 21a generates voice sound data from text data, and outputs voice sound based on the generated voice sound data through the speaker S.

Voice sound data is input through the microphones MC, MC to the voice recognition unit 21b (also referred to as "voice recognition means"), which generates text information from the input voice sound data, and outputs this text information to the main controller 40.

The sound-source position determination unit 21c identifies a position of a sound source (a position in a plane state that the robot R recognizes) based on a difference in the sound pressure and the time of sound arrival between the microphones MC, MC, and outputs this identified position of the sound source to the main controller 40. The position of the sound source may be represented by a rotational angle $\theta z$ around the direction where the robot R stands (i.e. z axis direction).

[Storage]

The storage 30 may be constituted, for example, of general-purposed hard disks, and stores necessary information (e.g. local map data and data for speech) sent from the management computer 3. The storage 30 stores information necessary for the main controller 40 to execute various operations, as described later.

[Main Controller]

The main controller 40 integrally controls the image processor 10, the audio processor 20, the storage 30, the autonomous motion control unit 50, the wireless communication unit 60, the object detector 80 and the circumference sensor 90.

Data detected by the gyro sensor SR1 and GPS receiver SR2 is output to the main controller 40, where the received data is used for determination of the robot R's behavior. The main controller 40 performs various determinations to provide various controls, such as on communication to the management computer 3; on execution of a predetermined task in response to a task execution instruction acquired from the management computer 3; on moving the robot R to a destination; on identification of a person: on conversation with a person, and also generates various instructions for motions of each part of the robot R.

[Autonomous Motion Control Unit]

The autonomous motion control unit 50 drives the head R1, each arm R2, each leg R3 and the body R4, in response to the instructions from the main controller 40. The autonomous motion control unit 50 includes a neck control unit that drives a neck joint of the head R1; a hand control unit that drives finger joints of a hand of each arm R2; an arm control unit that drives a shoulder joints, elbow joints and wrist joints of the arms R2; a waist control unit that rotationally drives the body R4 relative to the legs R3 in the horizontal direction; and a leg control unit that drives hip joints, knee joints and ankle joints of the legs R3, which are not shown in the drawings. The neck control unit, the hand control unit, the arm control unit, the waist control unit and the leg control unit send their driving signals to the respective actuators that drive the head R1, the arms R2, the legs R3 and the body R4, respectively. In addition, as mentioned above, the autonomous motion control unit 50 may send an input traveling direction of the robot R or an input traveling speed of the robot R to the image-process determination unit 13, as input information, if necessary.

[Wireless Communication Unit]

The wireless communication unit 60 transmits and receives data to/from the management computer 3. The wireless communication unit 60 includes a public line communication device 61a and a wireless communication device 61b.

The public line communication device 61a is a wireless communication means utilizing public network such as mobile phone network, PHS (Personal Handyphone System) network. The wireless communication device 61b is a wireless communication means for a short distance wireless communication such as wireless LAN complying with IEEE 802.11b.

In response to an access request from the management computer 3, the wireless communication unit 60 selects the public line communication device 61a or the wireless communication device 61b to perform data communication with the management computer 3.

The battery 70 serves as a power supply source for supplying power required for motion on each part of the robot R. A rechargeable battery may be used as the battery 70, and recharging the battery 70 may be carried out at the battery supply areas B1, B2, B3 (see FIG. 1), for example.

[Object Detector]

The object detector 80 detects whether or not a person wearing a tag T exists in the vicinity of the robot R. The object detector 80 includes plural light-emitting parts 81 (only one shown in FIG. 6). The light-emitting parts 81 may be constituted of, for example, LED, and may be provided along the peripheral surface of the robot R's head R1, such as on the right and left sides or the back and front sides thereof (not shown). The object detector 80 emits, from each light-emitting part 81, infra-red ray including a signal representing a light-emitting part ID to identify each light-emitting part 81, and then receives a receiving report signal from the tag T when the gag T has received this infra-red ray. When receiving infra-red ray emitted from any of the light-emitting parts 81, based on the light emitting part ID included in this received infra-red ray, the tag T generates a receiving report signal; therefore, when the robot R refers to the light-emitting part ID included in this receipt report signal, the robot R determines in which direction the tag T exists, viewed from the robot R. In addition, the object detector 80 has a function to determine the distance to the tag T, based on the radio field intensity of the receiving report signal acquired from the tag T. Hence, the object detector 80 can determine where the tag T exists (i.e. distance and direction of the tag T), which indicates a position of the person H. Furthermore, the object detector 80 emits not only infra-red ray from each light-emitting part 81, but also transmits radio waves including a signal representing the robot ID from an antenna (not shown), whereby, when receiving the radio waves, the tag T can correctly identify which robot R has transmitted this infra-red ray. Details of such an object detector 80 and a tag T are disclosed in JP2006-192563A, for example.

[Circumference Sensor]

The circumference sensor 90 detects circumferential conditions in the vicinity of the robot R, and acquires self-position data detected by the gyro sensor SR1 or the GPS receiver SR2. The circumference sensor 90 includes a laser radiation unit 91 that radiates a slit light toward a search zone, a infra-red ray radiation unit 92 that radiates an infra-red ray toward the search zone, and a floor-surface camera 93 that takes an image of the search zone where the slit light or the infra-red ray is radiated. The circumference sensor 90 analyses a slit-light image (image when the slit light was radiated) of the search zone that has been taken by the floor-surface camera 93 and detects the floor surface conditions. In addition, the circumference sensor 90 analyzes the infra-red ray image (when the slit light was radiated) taken by the floor-surface camera 93 so as to detect the mark M (see FIG. 2), and based on the position (coordinates) of the detected mark M, the circumference sensor 90 calculates a positional relation between the mark M and the robot R. Details of such a circumference sensor 90 are disclosed in, for example, JP2006-167844A.

[Main Controller]

FIG. 10 is a block diagram showing the configuration of the main controller of the robot R in FIG. 6.

The main controller 40 includes a static obstacle integration unit 41, an object data integration unit 42, a behavior patterning unit 43, an internal condition detection unit 45 and a behavior plan management unit 46.

The static obstacle integration unit 41 integrates information regarding the circumferential conditions in the vicinity of the robot R detected by the circumference sensor 90, which is output to the behavior patterning unit 43. For example, when the static obstacle integration unit 41 detects an obstacle, such as a cardboard container, or a step on the floor surface of the traveling way of the robot R, and based on this integrated information regarding the obstacle, the behavior patterning unit 43 finds a detour route on a local detour module (not shown).

The object data integration unit 42 integrates identification data (object data) regarding an object, based on posture data of the robot R, recognition information generated by the image processor 10, and input data from the object detector 80 and the sound-source position determination unit 21c, and outputs this integrated object data to the object data storing means 31 of the storage 30. Using this integrated object data input, the object data storing means 31 creates an object map that records this integrated object data into the object type and the time.

The behavior patterning unit 43 stores various programs (modules) to execute an appropriate behavior pattern, and refers to the storage 30 for getting information necessary when executing each behavior pattern, and reflects this necessary information in the behavior pattern.

In the present embodiment, as shown in FIG. 10, the storage 30 includes a local map data storing means 32 and a scenario storing means 33, as well as an object data storing means 31.

The local map data storing means 32 stores maps of the vicinity of the robot R (local maps), as described with reference to FIG. 3. For example, the local maps may be acquired from the management computer 3.

The scenario storing means 33 stores various scenarios (acting scripts) correspondent to the respective behavior patterns. The scenarios include those regarding actions of, for example, stopping 1 meter ahead of a person or an obstacle (i.e. target object) when encountering this target object while walking, or lifting the arm R2 up to a predetermined position 10 minutes after stopping, as well as those regarding speech. The scenario storing means 33 also stores scenarios predefined for specifying a gesture as a physical behavior of moving at least one of the head R1, the arms R2, the legs R3 and the body R4 when the robot R performs a predetermined speech.

The behavior patterning unit 43 includes various modules that execute correspondent behavior patterns in accordance with variety of scenes and situations, using the object data storing means 31, the local map data storing means 32 or the scenario storing means 33, or in combination therewith, if necessary. The various modules may be, for example, a destination path module, a local detour module, a delivery module, a guide module and a human handling module, etc.

The destination path module finds a path from the robot R's current point to a destination where the robot R executes a particular task in the task execution area (e.g. searching a path between the nodes), and executes a traveling action along the found path to the destination. This destination path module refers to the map data and the current point of the robot R, and then calculates a minimum distance to the destination.

When an obstacle is detected while walking, the local detour module finds a detour route to get around the detected obstacle based on the obstacle information integrated by the static obstacle integration unit 41.

When an article delivery task is executed, the delivery module performs an action of receiving (gripping) an article from a person (client) who requests the article delivery, or an action of handing over (releasing) the article to a receiving person.

The guide module, for example, executes a task to navigate a visitor who came to a guide start point in the task execution area to a clerk at the information counter 305 in the guide area 301 (see FIG. 3).

When the article delivery task or the guide task is executed, the human handling module, for example, performs an action of speech, posture change, moving the arm R2 up and down or gripping, etc.

The internal condition detection unit 45 detects internal conditions of the robot R. In the present embodiment, the internal condition detection unit 45 detects the remaining power of the battery 70, for example. The internal condition detection unit 45 generates data regarding conditions of the robot R (e.g. the current position, the remaining power of the battery, the task execution status, etc.) as the status information at the predetermined time intervals, and outputs the generated status information to the conversation-triggering action control unit 47. The internal condition detection unit 45 outputs the generated status information via the wireless communication unit 60 to the management computer 3. Then, the management computer 3 registers for each robot R the input status information on the robot information database (not shown) stored in the storage 3a (see FIG. 1).

The behavior plan management unit 46 manages behavior plans to execute the various modules of the behavior patterning unit 43 in accordance with predetermined schedules. In the present embodiment, the behavior plan management unit 46 manages behavior plans, so as to execute a appropriate task in response to task execution instructions acquired from the management computer 3, and select an appropriate module required for executing the current task to be done.

[Image Processor Operations]

FIG. 11 is a flow chart showing various steps performed by the image processor 10 of FIG. 6

On the multiple-resolution image generation unit 11, the image processor 10 corrects distortions of an original image acquired by the visual sensor (S1), and then the image processor 10 down-sizes this distortion-corrected image to generate a lower resolution image having a lower resolution than that of the original image, and also generates at least one high-resolution image having a higher resolution than that of the low-resolution image (S2). On the image-process determination unit 13, the image processor 10 determines whether or not to process the high-resolution image in accordance with a predetermined rule or given input information (S3).

If the image-process determination unit 13 determines to process the high-resolution image (Yes at S3), the image processor 10, on the low-resolution image process unit 12, processes the low-resolution image generated by the multiple-resolution image generation unit 11, and generates target object information regarding a target object included in the low-resolution image (S4). On the image-process determination unit 13, the image processor 10 determines which high-resolution image to be processed if the multiple-resolution image generation unit 11 generates more than one high-resolution image, and also define a resolution process region on part of the low-resolution image (S5). On the high-resolution image process unit 14, the image processor 10 processes the resolution process region included in the high-resolution image, defined by the image-process determination unit 13, and generates the target object information regarding the target object included in the high-resolution image (S6).

If it is determined not to process the high-resolution image on the image-process determination unit 13, the image processor 10, on the low-resolution image process unit 12, processes the low-resolution image generated by the multiple-resolution image generation unit 11, and then generates the target object information regarding the target object included in the low-resolution image (S8). In this case, the image-process determination unit 13 of the image processor 10 defines no resolution process region, and the high-resolution image process unit 14 of the image processor 10 generates no target object information.

Following S6, on the image-process result generation unit 15, the image processor 10 determines whether or not the target object information of the low-resolution image process unit 12 and the target object information of the high-resolution image process unit 14 are matched. If both pieces of the information are matched, the image processor 10 uses both pieces of the target object information, otherwise the image processor 10 uses the target object information of the high-resolution image process unit 14 only, so as to generate recognition information, which is output to the main controller 40 (S7).

If following the S8, the image processor 10 generates, on the image-process result generation unit 15, the recognition information using the target object information generated by the low-resolution image process unit 12, and outputs this generated recognition information to the main controller 40.

As explained above, according to the present embodiment, the image-process determination unit 13 determines whether or not to process an image of interest, and if determining to process the image, the image-process determination unit 13 also appropriately determines which resolution of the image to be processed, and also defines a resolution process region for this image. Accordingly, the robot R of the present invention can increase the accuracy in recognition of a target object while reducing calculations required for the image process. Although the preferred embodiment of the present invention has been explained, the present invention is not limited to this explained embodiment. For example, in the preferred embodiment, the determining whether or not to process an image of interest on the image-process determination unit 13, and shapes and sizes of a resolution process region are merely exemplified for a good understanding of the present invention.

In the present embodiment, the robot R is explained as a two-leg type autonomous mobile robot, but is not limited to this, and may be applicable to other type robots such as an autonomous mobile robot that moves with wheels. In this case, such an autonomous mobile robot, although having movable members of wheels that correspond to legs of a two-leg type autonomous mobile robot, can achieve effects equivalent to those by the present invention.

The mobile robot of the invention provides the following effects.

In the mobile robot according to the present embodiment, the high-resolution image process unit defines a resolution process region based on an input information or a predetermined rule. Accordingly, the mobile robot is capable of desirably handling various situations including movements and or tasks performed by the robot, or target objects existing in the vicinity of the robot. In the mobile robot according to the present embodiment, the high-resolution image process unit processes only part of a high-resolution image having higher resolution. Accordingly, the mobile robot secures of the present embodiment secures a higher accuracy in recognition of a target object, while reducing calculations required for the image process.

In addition, the mobile robot according to the present embodiment secures a higher accuracy in recognition of a target object which is located straight ahead of the robot or in the direction of the robot's head facing.

Furthermore, the mobile robot according to the present embodiment also secures a higher accuracy in recognition of a target object, such as a person, which moves in the horizontal direction.

The embodiment according to the present invention has been explained as aforementioned. However, the embodiment of the present invention is not limited to those explanations, and those skilled in the art ascertain the essential characteristics of the present invention and can make the various modifications and variations to the present invention to adapt it to various usages and conditions without departing from the spirit and scope of the claims.

What is claimed is:

1. A mobile robot comprising an image processor that processes an image taken by a vision sensor and generates recognition information regarding a target object to be recognized included in the taken image, and a controller that integrally controls the mobile robot based on the generated recognition information, the image processor comprising:

a multiple-resolution image generation unit that downsizes the taken image to generate a low-resolution image having a resolution lower than that of the taken image and at least one high-resolution image having a resolution higher than that of the low-resolution image;

a low-resolution image process unit that processes the low-resolution image generated by the multiple-resolution image generation unit, and generates first target object information regarding the target object included in the low-resolution image;

an image-process determination unit that determines whether or not to process the high-resolution image in accordance with predetermined input information or a predetermined rule, also determines which high-resolution image having what resolution should be processed if the multiple-resolution image generation unit generates two or more high-resolution images, and then defines a resolution process region at part of the low-resolution image;

a high-resolution image process unit that processes a region in the high-resolution region that corresponds to the resolution process region at part of the low-resolution image defined by the image-process determination unit so as to generate second target object information regarding the target object included in the high-resolution image; and an image-process result generation unit that:

determines whether or not the first target object information generated by the low-resolution image process unit and the second target object information generated by the high-resolution image process unit are met, and based on the determination of the first and second target object information, uses at least either of the first and the second target object information, first and the second target object information, thereby to generate the recognition information.

2. The mobile robot according to claim 1, wherein, in accordance with the predetermined rule, the image-process determination unit defines the resolution process region at a center of the low-resolution image.

3. The mobile robot according to claim 1, wherein, in accordance with the predetermined rule, the image-process determination unit repeatedly defines the resolution process region in the low-resolution image, shifting the resolution process region in the horizontal direction in the low-resolution image.

4. The mobile robot according to claim 1, wherein the low-resolution image process unit extracts a face region of a person included in the low-resolution image as input information, and the image-process determination unit defines the resolution process region on this extracted face region extracted by the low-resolution image process unit.

5. The mobile robot according to claim 1, wherein, if input traveling direction or a future traveling direction of the mobile robot is input to the image-process determination unit as the input information, the image-process determination unit defines the resolution process region in the low-resolution image depending on the input traveling direction or the future traveling direction of the mobile robot.

6. The mobile robot according to claim 1, wherein, if input traveling speed or a future traveling speed of the mobile robot is input to the image-process determination unit as the input information, the image-process determination unit is more likely to determine to process a higher-resolution image and narrows the resolution process region in the low-resolution image as the input traveling speed or the future traveling speed becomes faster.

7. The mobile robot according to claim 1, wherein, if a direction and a sound pressure of a sound source of the target object are input as the input information from a sound-source position determination unit that identifies the direction and the sound pressure of the sound source, the image-process determination unit defines the resolution process region in the low-resolution image depending on the direction of the sound source.

8. The mobile robot according to claim 7, wherein, if the input sound pressure becomes smaller, the image-process determination unit is more likely to determine to process a higher-resolution image and narrows the resolution process region in the low-resolution image.

9. The mobile robot according to claim 1, wherein, if a direction and a distance to a tag attached on an object to be detected are input from a object detector for detecting the direction and the distance to the tag, the image-process determination unit defines the resolution process region in the low-resolution image depending on the input direction of the tag.

10. The mobile robot according to claim 9, wherein the image-process determination unit is more likely to determine to process a higher-resolution image and narrows the resolution process region in the low-resolution image as the input distance of the tag becomes greater.

11. The mobile robot according to claim 1, wherein,
when the mobile robot executes a transport task to transport an article, the low-resolution image process unit extracts a predetermined transport container on which the article are placed, which is included in the low-resolution image, as input information,
the image-process determination unit determines whether or not a task being currently executed by the mobile robot is the transport task, and defines the resolution process region on the transport container extracted by the low-resolution image process unit.

12. The mobile robot according to claim 1, wherein,
when the mobile robot executes a guide task to guide a person, a guide direction in which the person should be guided is input to the image-process determination unit as input information,
the image-process determination unit determines whether or not a task being currently executed by the mobile robot is the guide task, and defines the resolution process region in the low-resolution image depending on the input guide direction.

13. The mobile robot according to claim 1, wherein the image-process result generation unit uses both the first and the second target object information if the first and the second target object information are matched; otherwise uses only the second target object information if not matched, thereby to generate the recognition information.

* * * * *